Patented Sept. 16, 1952

2,610,948

UNITED STATES PATENT OFFICE 2,610,948

LUBRICATING COMPOSITIONS

Arnold J. Morway, Clark Township, Union County, and William C. Howell, Jr., Union, N. J., assignors to Standard Oil Development Company, a corporation of Delaware No Drawing. Application March 23, 1950, Serial No. 151,548

10 Claims. (Cl. 252—56)

This invention relates to new and improved lubricating compositions, particularly to lubricating compositions having increased viscosity indices. More particularly the invention pertains to lubricating compositions in which a viscosity index improving amount of materials such as polymerized methacrylate esters, polymerized isobutylene, copolymers of styrene and isobutylene and the like are added to lubricating oil.

This invention is particularly useful in establishing a procedure by which various of the viscosity index improving agents, such as those listed above, normally insoluble in lubricating oils, may be incorporated in such lubricating oils.

It is known in the art that various viscosity index improvers, when blended with a lubricating oil, improve the rate of change of viscosity with temperature. This improvement is brought about by the action of the additive material which increases the viscosity of the oil composition at higher temperatures, thereby affording to the oil composition more desirable lubricating characteristics at these higher temperatures, while at the same time causing a lesser relative increase in the low temperature viscosity. The rate of change of viscosity with temperature is recorded as the "viscosity index," a term which is now familiar to the art. There are practical limitations upon the final viscosity index which may be achieved in lubricating compositions. As the industry requires higher viscosity index oils, however, science is furnishing them by a process of selectivity of blending stocks, stringent refining methods, and the development of new and improved viscosity index improvers.

It is the purpose of this invention to furnish to the art novel lubricating compositions having high viscosity indices.

In one phase of the inventive concept a lubricating oil composition having desirably high viscosity index is prepared by combining a viscosity index improver of the type referred to above with a synthetic oil obtained from the "Oxo" process. This process may be described as the catalytic reaction of monoolefins with carbon monoxide and hydrogen. At temperatures of about 100° F. to 400° F. and under pressures in the order of 20 to 300 atmospheres in the presence of a catalyst, carbon monoxide and hydrogen react with a monoolefin to form an aldehyde. Further hydrogenation produces a primary alcohol. The process was first developed in Germany and was described in this country in a United States patent to Roelen, issued in 1943, No. 2,327,066.

Depending upon the starting olefin, various alcohols may be synthesized by this process. For example, a $C_7$ fraction isolated from the polymerization product of propylene, or of a mixture of $C_3$ and $C_4$ olefins, may be subjected to the Oxo process. The resulting mixture will be found to have a major porportion of a $C_8$ alcohol as well as a number of higher alcohols and other high molecular weight compounds.

In addition to the $C_7$ monoolefin fraction produced by the polymerization of propylene or of a mixture of $C_3$ and $C_4$ olefins described above, a wide variety of olefins may be subjected to this Oxo process. Any of the various olefins obtained by polymerizing ethylene, propylene or butylenes or mixtures thereof may be used as well as the olefins obtained from the hydrocarbon synthesis reaction. These olefins may contain, for example, from about 6 to about 12 carbon atoms and may be branched or straight chained.

From the mixture of reaction products of the Oxo process the desired cuts are segregated by distillation. For example, when a $C_7$ olefin prepared by polymerizing a mixture of $C_3$ and $C_4$ olefins is subjected to the Oxo reaction the primary reaction product is a $C_8$ alcohol. This alcohol distills at temperatures in the neighborhood of 355° F. to 375° F. Similarly, when a $C_8$ olefin such as diisobutylene is employed, the primary product is a $C_9$ alcohol, and when a $C_{12}$ olefin such as triisobutylene or tetrapropylene is employed, the primary product is $C_{13}$ alcohol. In each case the primary product alcohol is removed by distillation, and the remaining fraction, known as "Oxo bottoms," is employed in the compositions of the invention. If desired, additional fractionation such as topping or removal of a heavy residuum fraction, may be practiced.

In the preferred embodiment of this invention the synthetic oil used is the bottoms fraction remaining when $C_8$ alcohol is removed from the reaction products obtained by carrying out the Oxo process on a $C_7$ fraction which has been isolated from the polymerization product of propylene or of a mixture of $C_3$ and $C_4$ monoolefins. When the $C_8$ Oxo alcohols are distilled off, the bottoms or residuum left after the distillation contains a large portion of $C_9$ alcohols, higher boiling alcohols, acetals, esters, ethers, and hydrocarbons. If it is desired, a further distillation step may remove the $C_9$ Oxo alcohols along with any other low boiling material. The residuum left from this second distillation step represents approximately 33% to 35% of the residuum remaining after the $C_8$ Oxo alcohols are removed.

That portion of the product of the Oxo process remaining after the $C_8$ Oxo alcohol and the $C_9$ Oxo alcohol cuts are removed, that is to say, that portion remaining after the product has been subjected to a temperature of about 572° F. has the following approximate composition:

85.0% $C_{12}$ Oxo alcohols and higher alcohols
5.0% $C_{13}+$ acetals
5.0% $C_{14}$ esters of mixed alcohols and mixed acetates
5.0% high molecular weight ethers and hydrocarbons Inspection tests on this residuum show:

| | |
|---|---|
| Flash point °F. over | 350 |
| Pour point °F. | −55 |
| Viscosity: | |
| 100° F. Saybolt Universal seconds | 97.8 |
| 210° F. do | 38.5 |
| Viscosity index | 64.5 |

Although synthetic oil obtained as described above, that is, a bottoms fraction of reaction products of the Oxo process may be utilized in itself as a lubricating oil, its lubricating characteristics are much improved by the incorporation of suitable amounts of various viscosity index improvers. Among the various types of viscosity index improvers suitable for incorporation with this synthetic oil may be mentioned copolymers of styrene and isobutylene, polymers of acrylate and methacrylate esters of $C_8$–$C_{18}$ alcohols, polyisobutylene, and the like. It is preferred, however, to use the copolymers of styrene and isobutylene which have a styrene content of between 40% to 70%, 45% to 65% being preferred; a molecular weight of at least 10,000; and an intrinsic viscosity of at least 0.5, the copolymer being prepared at a temperature below about −80° C. The preparation of this preferred copolymer of styrene and isobutylene is set out in detail in a copending application Serial No. 780,766, filed October 18, 1947, now United States Patent No. 2,504,779.

The proportions in which the styrene isobutylene copolymer is added to or blended with the synthetic oil referred to above may vary between 0.1% and 20% by weight. The preferred range, however, is from 0.5% to 10% by weight.

A lubricating oil composition was prepared from the synthetic oil obtained by topping at a temperature of 572° F. the reaction product of a $C_7$ cut from the polymerization of a mixture of propylenes and butylenes in the Oxo process. With this synthetic oil was blended a copolymer of styrene and isobutylene having a styrene content of 60%, an intrinsic viscosity of 0.8, a molecular weight of about 50,000, and being prepared at a temperature of −103° C. The viscosity data obtained from this blend is set out in Table I below:

*Table I*

| | Viscosity, S. U. S. | | Viscosity Index |
|---|---|---|---|
| | 100° F. | 210° F. | |
| Synthetic Oil | 97.8 | 38.5 | 64.5 |
| Synthetic Oil+8.0% Copolymer | 2,395.0 | 266.2 | 128 |

An examination of the data of Table I above will show the outstanding improvement obtained by blending with the synthetic oil the viscosity index improving copolymer. The viscosity was raised markedly at both 100° F. and 210° F. and the viscosity index was improved a total of 63½ units using 8% of the copolymer.

Removal of additional low boiling materials from the Oxo bottoms reaction products results in a residuum having desirable properties as a lubricating medium. For instance, when the reaction products obtained by subjecting to the Oxo process a $C_7$ fraction from the polymerization of a mixture of propylenes and butylenes was distilled at a temperature of 740° F., the bottoms fraction was a synthetic oil having the following characteristics:

| | |
|---|---|
| Flash point °F. | 415 |
| Pour point °F. | −45 |
| Viscosity: | |
| 100° F. Saybolt Universal seconds | 166.1 |
| 210° F. do | 43.7 |
| Viscosity index | 88 |

Using this synthetic oil as a base stock, blends were made of the following viscosity index improvers: (1) the copolymer of styrene and isobutylene described above in connection with Table I; (2) polymerized polybutene of about 14,000–17,000 Staudinger molecular weight as a 20% solution in mineral oil; and (3) a polymerized methacrylate ester having a Staudinger molecular weight of about 17,000 as a 40% solution in mineral oil. The following table shows the improvement in viscosity and viscosity index obtained by this blending

*Table II*

| Oil | Flash, °F. | Pour, °F. | Viscosity, S. U. S. | | V. I. |
|---|---|---|---|---|---|
| | | | 100° F. | 210° F. | |
| Base Stock | 415 | −45 | 165.9 | 43.6 | 88 |
| Base Stock+1.0% Copolymer (1) | | | 275.1 | 54.7 | 123.5 |
| Base Stock +2.5% Copolymer (1) | | | 555.3 | 83.5 | 132.5 |
| Base Stock +5.0% Copolymer (1) | | | 1,626.9 | 194.2 | 130.0 |
| Base Stock +5.0% Polymer (2) | | | 242.9 | 51.1 | 116 |
| Base Stock +5.0% Polymer (3) | | | 313.7 | 60.6 | 133 |

An inspection of the data reported in Table II above points out the marked increase in viscosity and viscosity indices obtained by blending the various viscosity index improving agents with the synthetic oil base stock.

As thus far described, the invention has been applied to synthetic oil base stocks which have been prepared by "topping" or distilling off the lower boiling portions of the reaction products obtained when monoolefins are subjected to the action of carbon monoxide and hydrogen in the Oxo process. In a further embodiment of this invention "heart cuts" consisting of intermediate fractions obtained by removing both the light and heavy constituents of the total Oxo reaction product may also be used. For certain applications as where it is desired to obtain lubricating oils of high viscosity index concurrent with low viscosities at 210° F., the use of such "heart cuts" may be preferred to the use of the total product from which only the light fractions have been removed. For example, in the formulation of certain types of hydraulic oils and fluids for fluid couplings and hydraulic torque converters, it is generally desirable that the viscosity not exceed about 60 Saybolt Universal seconds at 210° F. while at the same time having a viscosity index of about 125 or better.

As illustrative of the manner in which this invention can be applied to the formulation of such oils a "heart cut" was prepared by fractionating a 496° F. to 594° F. cut from the reaction product obtained when a C₇ fraction obtained from the polymerization of propylenes and butylenes was subjected to the action of carbon monoxide and hydrogen in the Oxo process. The properties of this "heart cut" are shown in Table III below. Shown also in Table III are data on this "heart cut" after the addition of a polymerized methacrylate ester type viscosity index improver. It will be observed from the data in Table III that the polymerized methacrylate ester type viscosity index improver was completely soluble in concentrations as high as 12.0% by weight and gave outstanding viscosity index improvement.

*Table III*

| Blend | Viscosity, S. U. S. | | V. I. |
|---|---|---|---|
| | 100° F. | 210° F. | |
| Base Oil ¹ | 64.5 | 32.9 | <0 |
| Base Oil +8.0% Methacrylate Ester Polymer Viscosity Index Improver | 139.0 | 44.4 | 136 |
| Base Oil +12% Methacrylate Ester Polymer Viscosity Index Improver | 199.7 | 52.5 | 147.5 |

¹ 496°/594° F. cut from total Oxo bottoms.

It will be noted from the data in Table III above that the blends of synthetic base oil with the methacrylate type viscosity index improvers have viscosity and viscosity index characteristics very satisfactory for use as hydraulic fluids or as power transmission fluids. The usefulness of blends of this type can be further suited for specific applications by the inclusion of other additive materials such as oxidation inhibitors, corrosion inhibitors, anti-foaming agents, detergents, and the like.

The copolymer of styrene and isobutylene described in connection with Table II above has outstanding properties as a viscosity index improver when blended with synthetic oils. This fact is borne out by the data in Table II. However, this copolymer is incompatible with some particularly desirable lubricating oils. When blended therewith directly in the normal procedures, the copolymer forms a cloudy dispersion and subsequently precipitates from the oil.

This phenomena of insolubility is experienced with all conventional types of naturally occurring mineral oils as well as certain of the synthetic oils. Among the natural occurring mineral oils are the oils obtained by solvent extracting and/or acid treating naphthenic or paraffinic distillates. Among the synthetic oils with which the styrene-isobutylene copolymer is incompatible may be mentioned the polyglycol ethers, polyglycol esters, and polyglycol ether esters.

It has now been found, and forms a second concept of this invention, that the synthetic oil obtained by topping at 740° F. the reaction products obtained by subjecting a C₇ fraction from the polymerization of propylenes and butylenes to the Oxo process, acts as a mutual solvent for the styrene-isobutylene copolymer in the oils normally incompatible therewith. By first blending with a desired portion of the synthetic oil the desired amount of the styrene-isobutylene copolymer, a successful blend of the copolymer and the incompatible oil is accomplished. Amounts of the mutual solvent and the copolymer will depend upon the concentration of the copolymer desired in the final blend.

Set out in Table IV below are data obtained on blends of the copolymer and a synthetic oil of the polyglycol ether type and an acid-treated mineral oil distillate, these two oils both being incompatible with the copolymer alone. The concentrate of the copolymer in the bottoms fraction was obtained by adding the copolymer to the bottoms material and heating with stirring to 250° F. to 300° F. The blend was accomplished by merely pouring the concentrate into the oil and agitating.

*Table IV*

| Material | Percent Concentrate Employed (5% Copolymer in Bottoms) | Actual Percent Copolymer in Blend | Viscosity, S. U. S. | | V. I. |
|---|---|---|---|---|---|
| | | | Vis./100 | Vis./210 | |
| Synthetic Oil | None | None | 64.8 | 35.9 | 120 |
| Do | ¹ 20.0 | 1.0 | 105.6 | 42.9 | 166.3 |
| Mineral Oil | None | None | 131.2 | 40.1 | 27 |
| Do | ¹ 20.0 | 1.0 | 233.7 | 51.2 | 122 |

¹ Forms excellent clear solutions.

The data reported in the above table shows that the incorporation of the copolymer in the two oils resulted in blends having very desirable viscosity-temperature characteristics, as exemplified by the high viscosity indexes.

As a further embodiment of this invention it has been found that the synthetic oil obtained by topping the Oxo reaction products at 740° F., combined with the desired proportion of the styrene-isobutylene copolymer as described above, is an excellent dispersing agent for any of the common grease forming soap materials. The following formulations represent a specific example of this embodiment.

Using 6% lithium hydroxy stearate, 2% lithium stearate and 92% of the synthetic oil containing 1% by weight of a 60% styrene-40% isobutylene copolymer, a grease was prepared in the conventional manner by heating the oil and soap to 400° F. and rapidly cooling in thin layers. An excellent smooth grease of good structure stability resulted. Inspection tests on this grease showed the following results:

Unworked penetrations _____mm./10__ 280
Worked 10,000 strokes _____mm./10__ 340
Dropping point ° F. _____ 365

To summarize briefly, this invention comprises new and useful lubricating compositions obtained by blending with a specific synthetic oil the desired amount of viscosity index improving agents. A particular embodiment of the invention is the discovery that a synthetic oil, obtained by topping the reaction products of the Oxo process, is a mutual solvent for a viscosity index improving agent formed by copolymerizing styrene and isobutylene and a lubricating oil which is normally incompatible with the copolymer.

What is claimed is:

1. A lubricating composition which comprises a synthetic lubricating oil having a viscosity at 210° F. within the range of from about 30 to about 60 Saybolt Universal seconds and a flash point above about 250° F. having combined therein from about 0.5% to 20.0% by weight of a viscosity index improver selected from the class consisting of polymers of acrylate esters, polymers of methacrylate esters, polymers of isobutylene and copolymers of styrene and isobutylene, said synthetic lubricating oil being a residue remaining after distillation at a temperature within a range of about 542° F. to about 740° F. of the mixture of products obtained by subjecting monoolefins to the action of carbon monoxide and hydrogen in the Oxo process.

2. A lubricating composition which comprises a synthetic lubricating oil having a viscosity at 210° F. of between about 30 and 60 Saybolt Universal seconds and a flash point above about 250° F. having combined therein from about 0.5 to 20.0% by weight of a copolymer of styrene and isobutylene having a molecular weight in excess of 10,000, a styrene content of from 40% to 70% and an intrinsic viscosity of more than 0.5, said synthetic lubricating oil being a residue remaining after distillation at a temperature within a range of about 542° F. to about 740° F. of the mixture of products obtained by subjecting monoolefins to the action of carbon monoxide and hydrogen in the Oxo process.

3. A lubricating composition according to claim 2 wherein said copolymer of styrene and isobutylene has a molecular weight within a range of from 10,000 to 50,000 and a styrene content of from 45% to 65% and an intrinsic viscosity of about 0.8.

4. A lubricating composition according to claim 2 wherein said copolymer of styrene and isobutylene has a molecular weight of about 50,000, a styrene content of about 60% and an intrinsic viscosity of about 0.8.

5. A lubricating composition which comprises a synthetic lubricating oil having a viscosity at 210° F. within a range of from about 30 to about 60 Saybolt Universal seconds and a flash point above about 250° F. having combined therein from about 0.5% to 20.0% by weight of a viscosity index improver selected from the class consisting of polymers of acrylate esters, polymers of methacrylate esters, polymers of isobutylene and copolymers of styrene and isobutylene, said synthetic lubricating oil consisting of the residue remaining after distillation at 740° F. of the mixture of products obtained by subjecting monoolefins to the action of carbon monoxide and hydrogen in the Oxo process.

6. A lubricating composition which comprises a synthetic lubricating oil having a viscosity at 210° F. within a range of from about 30 to 60 Saybolt Universal seconds and a flash point above about 250° F. having combined therein from 0.5 to 20.0% by weight of a copolymer of styrene and isobutylene having a molecular weight in excess of 10,000, a styrene content of from 40% to 70% and an intrinsic viscosity of more than 0.5 and having been prepared by copolymerizing at a temperature below −80° C., said synthetic lubricating oil consisting of the residue remaining after distillation at 542° F. of the mixture of products obtained by subjecting monoolefins to the action of carbon monoxide and hydrogen in the Oxo process.

7. A lubricating composition according to claim 6 wherein said copolymer of styrene and isobutylene has a molecular weight within a range of from 10,000 to 50,000, a styrene content of from 45% to 65% and an intrinsic viscosity of 0.8.

8. A lubricating composition having an improved viscosity-temperature relationship which comprises a major proportion of a mineral lubricating oil which will not dissolve a copolymer of styrene and isobutylene having a styrene content of between 45 and 65%, an intrinsic viscosity of 0.8 and a molecular weight within a range of from 10,000 to 50,000, containing dissolved therein a blend of said copolymer of styrene and isobutylene and a synthetic oil having a viscosity at 210° F. within a range from about 30 to about 60 Saybolt Universal seconds and a flash point above about 250° F., said synthetic oil being the residue remaining after distillation at 740° F. of the mixture of products resulting when monoolefins are subjected to the action of carbon monoxide and hydrogen in the Oxo process, said lubricating composition containing from about 0.5 to 20.0% by weight of said copolymer.

9. A lubricating composition according to claim 8 wherein said lubricating oil is a naturally occurring petroleum distillate.

10. A lubricating composition according to claim 8 wherein said lubricating oil is a synthetic lubricating oil selected from the class consisting of polyglycol ethers, polyglycol esters, and polyglycol ether esters.

ARNOLD J. MORWAY.
WILLIAM C. HOWELL, Jr.

REFERENCES CITED

The following references are of record in the file of this patent:

UNITED STATES PATENTS

| Number | Name | Date |
| --- | --- | --- |
| 2,274,749 | Smyers | Mar. 3, 1942 |
| 2,415,102 | Landgraf | Feb. 4, 1947 |
| 2,481,278 | Ballard | Sept. 6, 1949 |
| 2,489,281 | Foehr | Nov. 29, 1949 |
| 2,489,300 | Leyda | Nov. 29, 1949 |
| 2,499,984 | Beavers | Mar. 7, 1950 |
| 2,512,771 | Glavis | June 27, 1950 |